United States Patent
Huang (10) Patent No.: US 12,454,323 B2
(45) Date of Patent: Oct. 28, 2025

(54) BICYCLE SEATPOST CAPABLE OF MOUNTING WITH BICYCLE ACCESSORY

(71) Applicant: J.D COMPONENTS CO., LTD., Chang Hua Hsien (TW)

(72) Inventor: Chun-Wei Huang, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 211 days.

(21) Appl. No.: 18/339,733

(22) Filed: Jun. 22, 2023

(65) Prior Publication Data
US 2023/0415838 A1    Dec. 28, 2023

(30) Foreign Application Priority Data
Jun. 22, 2022 (TW) ................................. 111206624

(51) Int. Cl.
*B62J 1/28* (2006.01)
*B62J 45/00* (2020.01)

(52) U.S. Cl.
CPC ................. *B62J 1/28* (2013.01); *B62J 45/00* (2020.02)

(58) Field of Classification Search
CPC ..................................... B62J 1/28; B62J 45/00
USPC .............. 297/188.12, 195.1, 215.13, 215.14, 297/215.15, 215.16
See application file for complete search history.

(56) References Cited

U.S. PATENT DOCUMENTS

| | | | | |
|---|---|---|---|---|
| 4,826,192 A | * | 5/1989 | Borromeo | B62J 1/08 280/281.1 |
| 4,850,733 A | * | 7/1989 | Shook | B62J 1/08 403/104 |
| 7,722,115 B2 | * | 5/2010 | Biro | B62J 1/08 297/215.15 |
| 11,649,003 B2 | * | 5/2023 | Hara | B62J 45/421 297/215.13 |
| 11,679,829 B1 | * | 6/2023 | Miles | B62J 1/06 297/215.14 |
| 11,780,522 B2 | * | 10/2023 | Tso | B62J 11/19 297/215.13 |
| 2008/0192497 A1 | * | 8/2008 | Chao | B62J 1/08 362/473 |

(Continued)

FOREIGN PATENT DOCUMENTS

| | | | | |
|---|---|---|---|---|
| JP | 2007328378 A | * | 12/2007 | ............. B62J 99/00 |
| KR | 20090005052 U | * | 5/2009 | |

(Continued)

*Primary Examiner* — Jose V Chen
(74) *Attorney, Agent, or Firm* — Muncy, Geissler, Olds & Lowe, P.C.

(57) ABSTRACT

A bicycle seatpost includes a seatpost body and a reinforcing member. The seatpost body has an opening through inner and outer surfaces thereof. The reinforcing member is fixed to the inner surface of the seatpost and has a part corresponding to the opening, such that an installation space is formed between the reinforcing member and the opening for installation of a bicycle accessory. As such, the bicycle seatpost of the present invention uses the opening to install the bicycle accessory (such as a lamp, rearview lens, rear bag, or bottle cage), and uses the reinforcing member to make the seatpost body maintain sufficient structural strength, such that the seatpost body will not weaken its structure due to the opening.

12 Claims, 7 Drawing Sheets

(56) References Cited

U.S. PATENT DOCUMENTS

| | | | |
|---|---|---|---|
| 2008/0258517 A1* | 10/2008 | Julliard | B62K 19/36 |
| | | | 297/215.13 |
| 2014/0153270 A1 | 6/2014 | Lai | |
| 2015/0210341 A1* | 7/2015 | Chen | B62K 19/36 |
| | | | 403/109.5 |
| 2016/0236739 A1* | 8/2016 | Shirai | B62J 1/08 |
| 2016/0362153 A1* | 12/2016 | Shirai | B62J 1/08 |
| 2018/0105222 A1* | 4/2018 | Tepass | B62K 19/36 |
| 2019/0210211 A1* | 7/2019 | Reece | B25G 1/102 |
| 2023/0211844 A1* | 7/2023 | Lin | B62J 1/08 |
| | | | 297/215.13 |
| 2023/0303212 A1* | 9/2023 | Mendo | B62J 50/22 |
| 2024/0010290 A1* | 1/2024 | Haussler | B62J 43/20 |
| 2024/0101207 A1* | 3/2024 | Shirai | H02K 7/116 |
| 2025/0002104 A1* | 1/2025 | Keen | B62J 1/28 |

FOREIGN PATENT DOCUMENTS

| | | |
|---|---|---|
| KR | 101961159 B1 * | 3/2019 |
| TW | I275510 B | 3/2007 |

* cited by examiner

BICYCLE SEATPOST CAPABLE OF MOUNTING WITH BICYCLE ACCESSORY

BACKGROUND OF THE INVENTION

1. Field of the Invention

The present invention relates to bicycles and more particularly, to a bicycle seatpost capable of mounting with a bicycle accessory.

2. Description of the Related Art

A bicycle seat tube disclosed by TW 1275510 provides an insert hole in a tubular member for insertion of a housing seat, such that a warning device can be installed in a concave chamber of the housing seat. In addition, a seatpost disclosed by US 2014/0153270 has a recess portion for installation of a lighting assembly. In the aforesaid prior arts, the tubular member/seatpost needs to support the weight of a rider, so they have to maintain sufficient structural strength. However, the tubular member/seatpost will have a problem of structural weakness at the position of the insert hole/recess portion. This easily causes a certain degree of danger in riding, and therefore there is still room for improvement in structure.

SUMMARY OF THE INVENTION

It is a primary objective of the present invention to provide good structural strength so as not to be weakened because of setting an opening.

To attain the above objective, the bicycle seatpost of the present invention comprises a seatpost body and a reinforcing member. The seatpost body has an inner surface, an outer surface, and an opening through the inner and outer surfaces. The reinforcing member is disposed to the inner surface of the seatpost body and has a part corresponding to the opening, such that an installation space is formed between the reinforcing member and the opening for installation of a bicycle accessory.

It can be seen from the above that the bicycle seatpost of the present invention uses the opening for installation of the bicycle accessory (such as a lamp, rearview lens, rear bag, or bottle cage), and uses the reinforcing member to make the seatpost body maintain sufficient structural strength, such that the seatpost body will not weaken its structure because of the opening.

Preferably, two opposite lateral sides of the reinforcing member are fixed to the inner surface of the seatpost body, and the reinforcing member extends straight along a radial direction of the seatpost body. In this way, the reinforcing member has a linear cross-sectional shape.

Preferably, two opposite lateral sides of the reinforcing member are fixed to the inner surface of the seatpost body, and the reinforcing member extends curvedly away from the opening. In this way, the reinforcing member has a concave arced cross-sectional shape.

Preferably, two opposite lateral sides of the reinforcing member are fixed to the inner surface of the seatpost body, and the reinforcing member extends curvedly towards the opening. In this way, the reinforcing member has a convex arced cross-sectional shape to facilitate setting a gas cylinder in the seatpost post.

Preferably, the reinforcing member extends along an axial direction of the seatpost body. A top end of the reinforcing member is higher than a top end of the opening, and a bottom end of the reinforcing member is lower than a bottom end of the opening.

Preferably, the reinforcing member has a threaded hole communicating with the opening for mounting with the bicycle accessory (such as a lamp, rearview lens, rear bag, or bottle cage) by using a screw.

Preferably, the opening can be set at a front side of the seatpost body or a rear side of the seatpost body according to actual needs.

Preferably, the opening can extend along an axial direction of the seatpost body, or can be designed in different shapes according to actual needs.

Preferably, the bicycle accessory is installed in the installation space in a manner that the bicycle accessory does not protrude out of the outer surface of the seatpost.

Preferably, the bicycle accessory is installed in the installation space in a manner that the bicycle accessory extends along an axial direction of the seatpost body.

Preferably, the bicycle accessory is an electrical component for electrically connected to a rechargeable battery disposed at a bottom end of the seatpost body.

Other advantages and features of the present invention will be fully understood by reference to the following specification in conjunction with the accompanying drawings, in which like reference signs denote like components of structure.

DETAILED DESCRIPTION OF THE INVENTION

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in the contents of the specification are also just for illustrative description on the basis of normal usage direction, not intended to limit the claimed scope.

Figure 1:
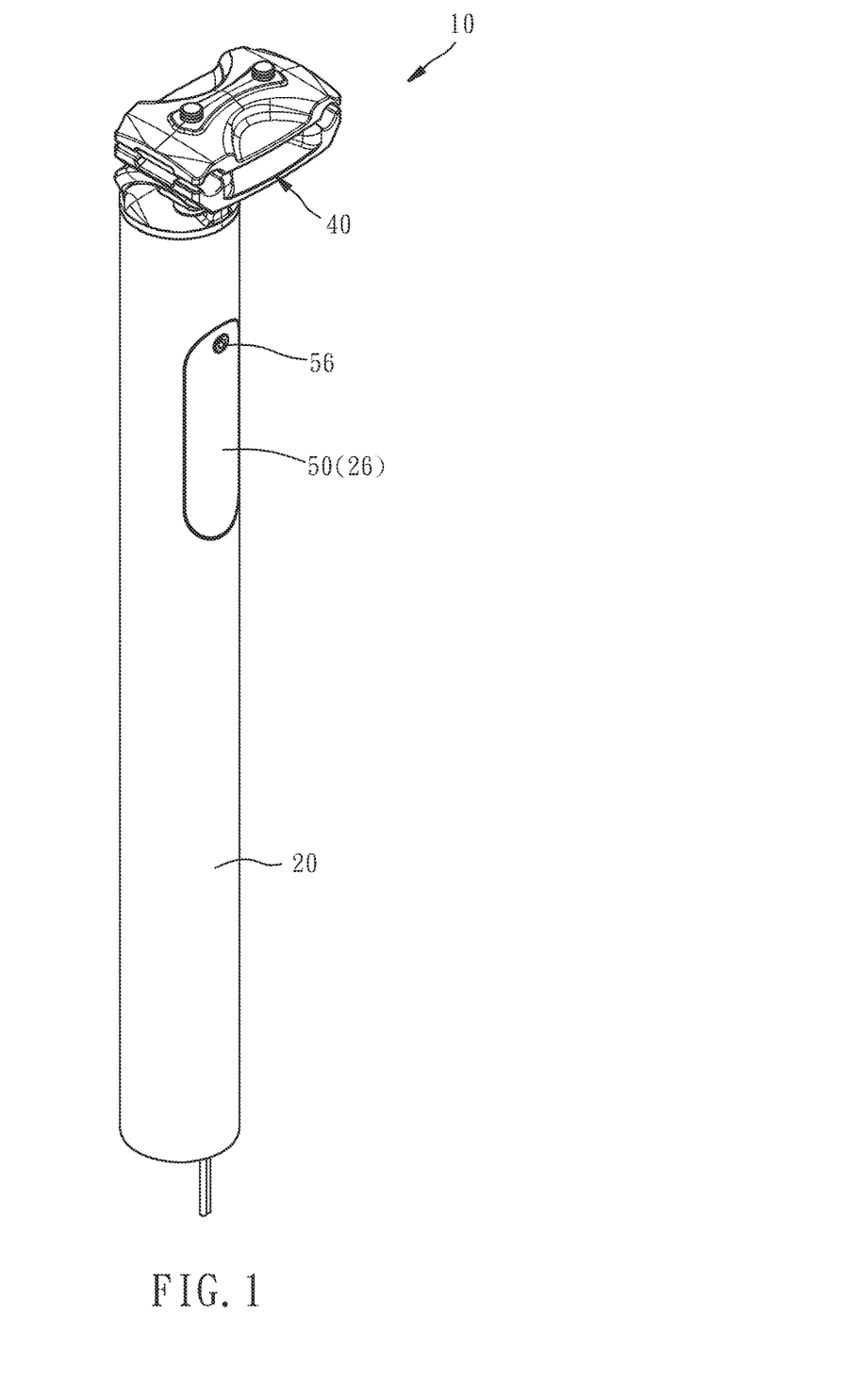
FIG. 1 is a perspective view of a bicycle seatpost of the present invention, in which the bicycle seatpost is mounted with a bicycle accessory.
Figure 2:
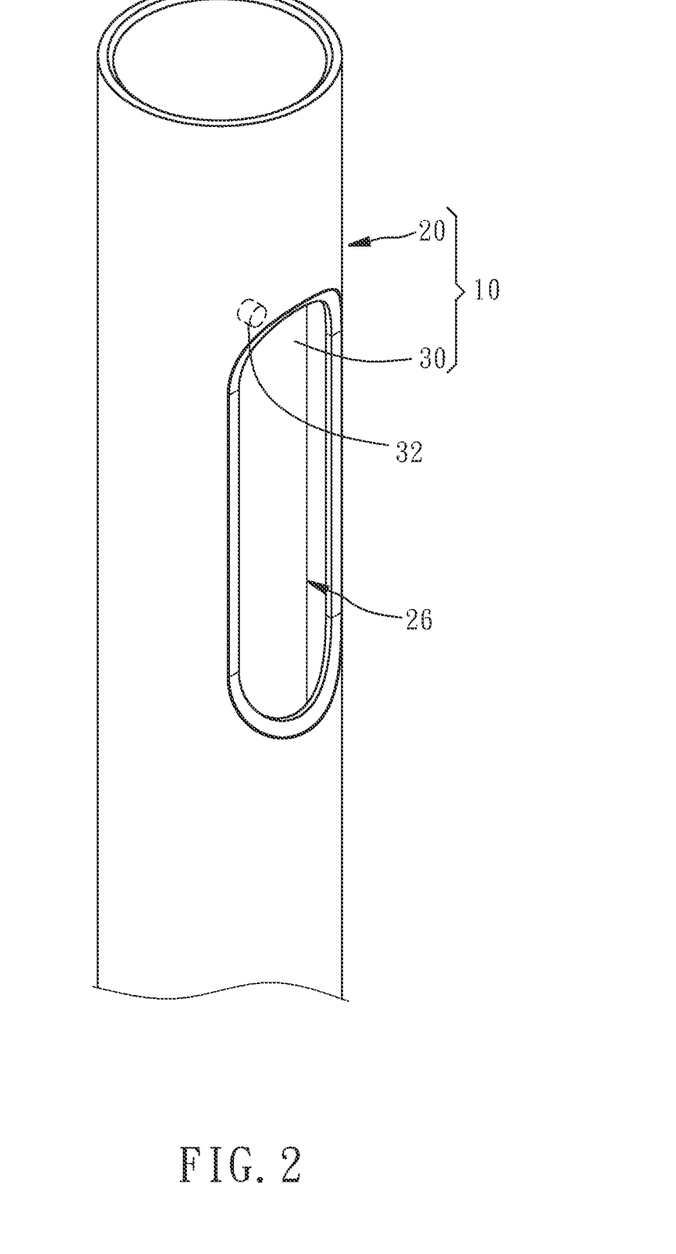
FIG. 2 is a perspective view of the bicycle seatpost of the present invention.

Referring to FIGS. 1 and 2, a bicycle seatpost 10 of the present invention comprises a seatpost body 20 and a reinforcing member 30.

Figure 3:
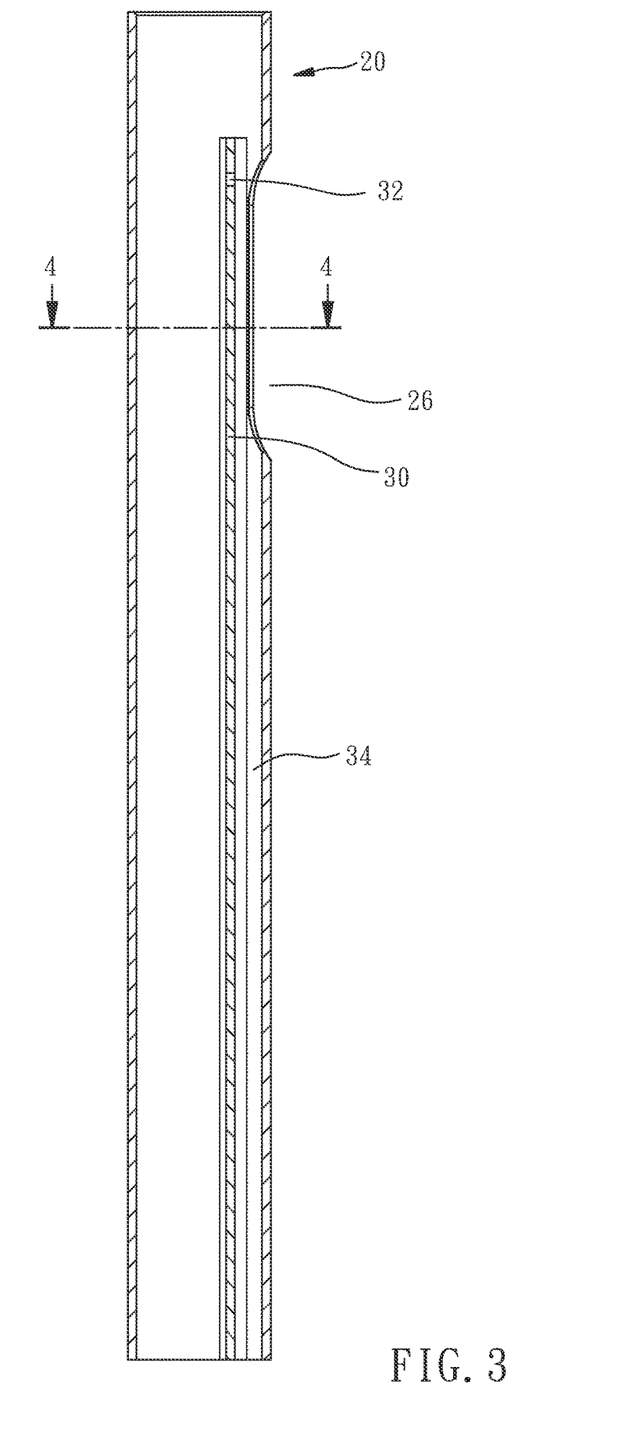
FIG. 3 is an axial sectional view of the bicycle seatpost of the present invention.

The seatpost body 20 is disposed movably upwards and downwards in a seat tube (not shown). The top end of the seatpost body 20 is used for mounting with a saddle clamping component 40. As shown in FIGS. 2 and 3, the seatpost body 20 has an inner surface 22, an outer surface 24, and an opening 26 through the inner and outer surface 22, 24. In this embodiment, the opening 26 is located at the rear side of the seatpost body 20 and extends along the axial direction of the seatpost body 20. What needs to be added here is that the shape, number and position of the opening 26 are not limited to this embodiment, that is to say, the opening 26 can be designed into different appearances according to actual needs. In terms of number, the opening 26 can be added to two or more, and in term of position, the opening 26 can be set at the front side of the seatpost body 20 and not limited to the rear side of the seatpost body 20.

Figure 4:
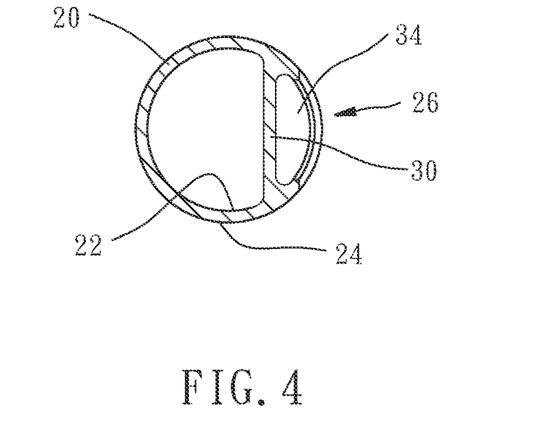
FIG. 4 is a sectional view taken along line 4-4 of FIG. 3.
Figure 5:
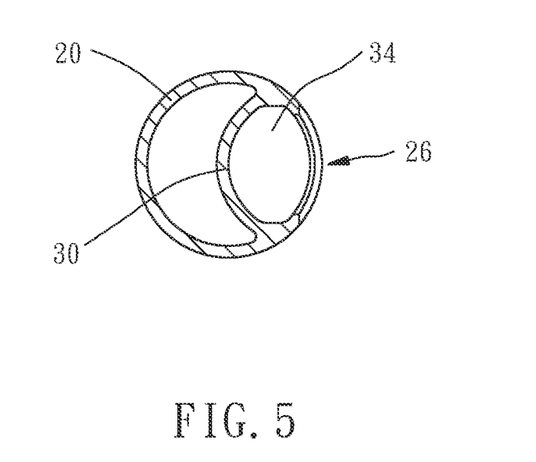
FIG. 5 is similar to FIG. 4, showing that the reinforcing member has a concave arced cross-sectional shape.
Figure 6:
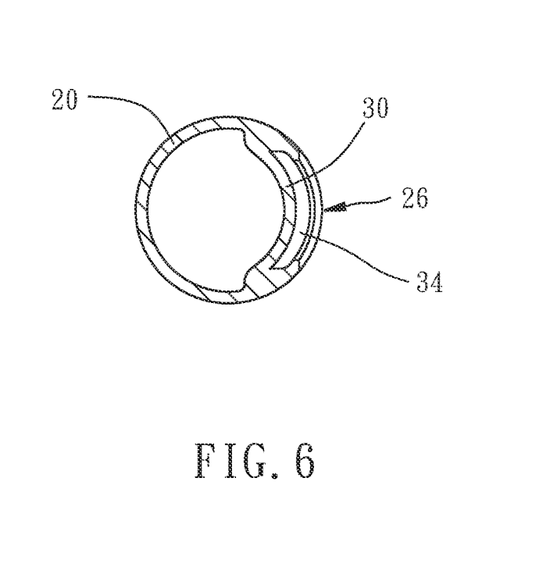
FIG. 6 is similar to FIG. 4, showing that the reinforcing member has a convex arced cross-sectional shape.

As shown in FIGS. 2 and 3, the reinforcing member 30 is fixed to the inner surface 22 of the seatpost body 20 by electric welding or extrusion processing and has a part corresponding to the opening 26, such that an installation space 34 (as shown in FIGS. 3 and 4) is formed between the reinforcing member 30 and the opening 26. In this embodiment, two opposite long lateral sides the reinforcing member 30 are fixed to the inner surface 22 of the seatpost body 20, and the reinforcing member 30 extends straight along the radial direction of the seatpost body 20, such that the reinforcing member 30 has a linear cross-sectional shape. However, in fact, the reinforcing member 30 can have different cross-sectional shapes. For example, as shown in FIG. 5, the reinforcing member 30 extends curvedly away from the opening 26 so as to have a concave arced cross-sectional shape. As shown in FIG. 6, the reinforcing member 30 extends curvedly towards the opening 26, such that the reinforcing member 30 has a convex arced cross-sectional shape to facilitate setting a gas cylinder (not shown) in the seatpost body 20.

Figure 7:
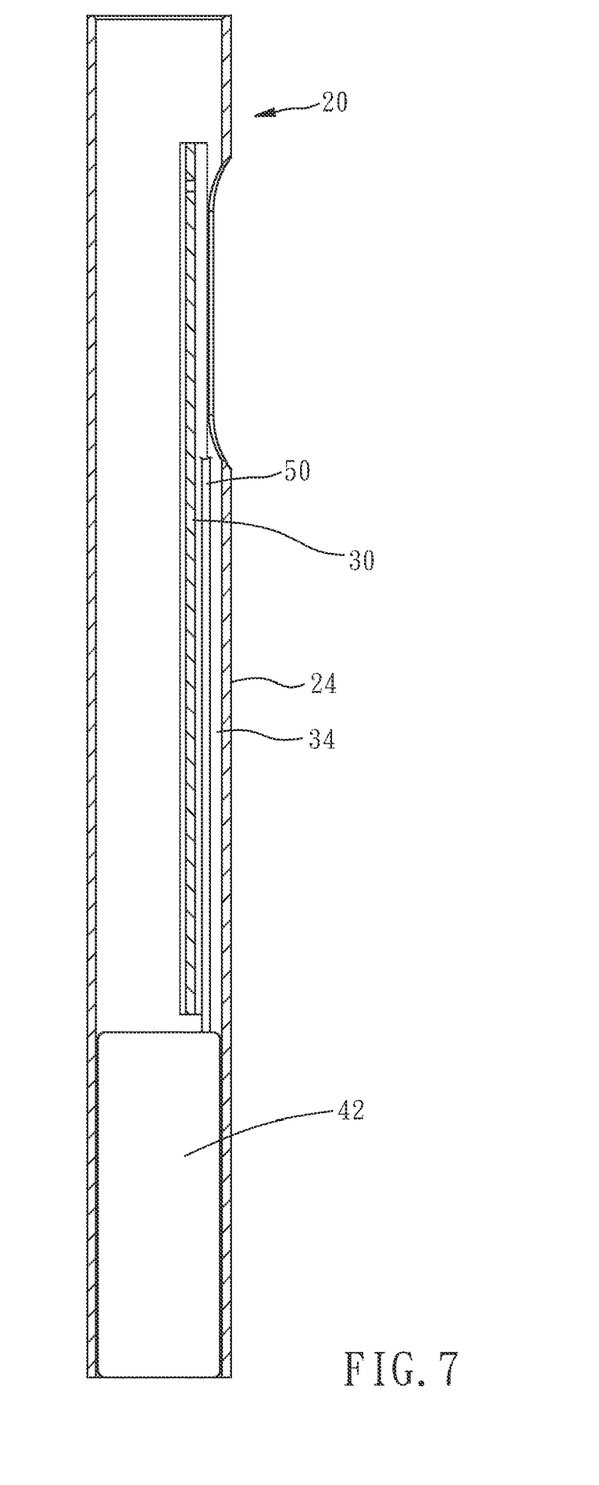
FIG. 7 is similar to FIG. 3, showing that the reinforcing member does not extend to the bottom end of the seatpost body.

In addition, no matter which cross-sectional shape the reinforcing member has, the reinforcing member 30 extends straight along the axial direction of the seatpost body 20, and further, the top end of the reinforcing member 30 is higher than the top end of the opening 26 and the bottom end of the reinforcing member 30 is lower than the bottom end of the opening 26. What needs to be added here is that the bottom end of the reinforcing member 30 extends to be flushed with the bottom end of the seatpost body 20 in this embodiment (as shown in FIG. 3). However, in fact, the bottom end of the reinforcing member 30 also can extend to generate a height difference between the bottom end of the seatpost body 20, so that the bottom end of the seatpost body 20 has proper space for installation of a rechargeable battery 42 (as shown in FIG. 7).

Figure 8:
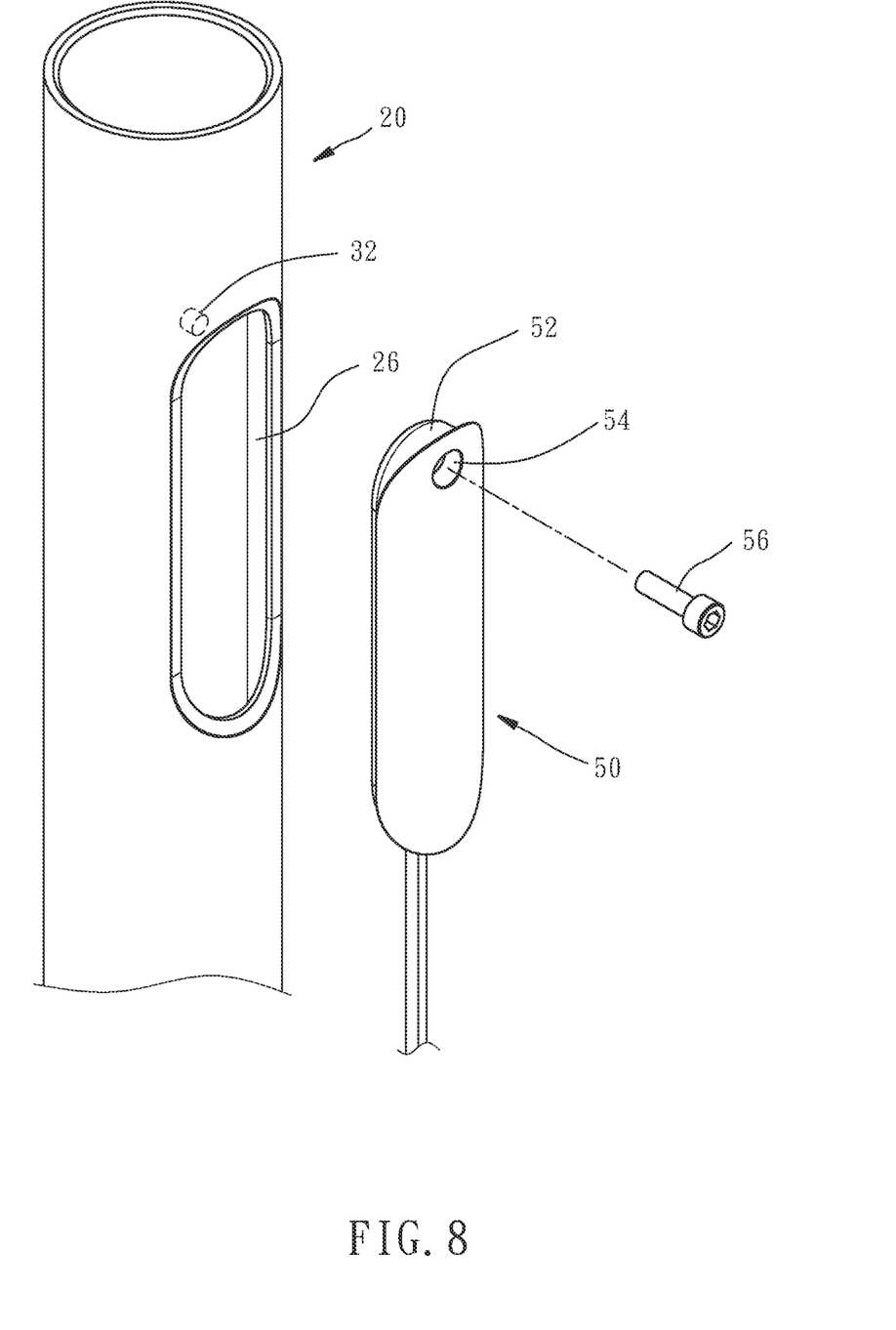
FIG. 8 is an exploded view, showing that the bicycle seatpost is mounted with one kind of the bicycle accessory.
Figure 9:
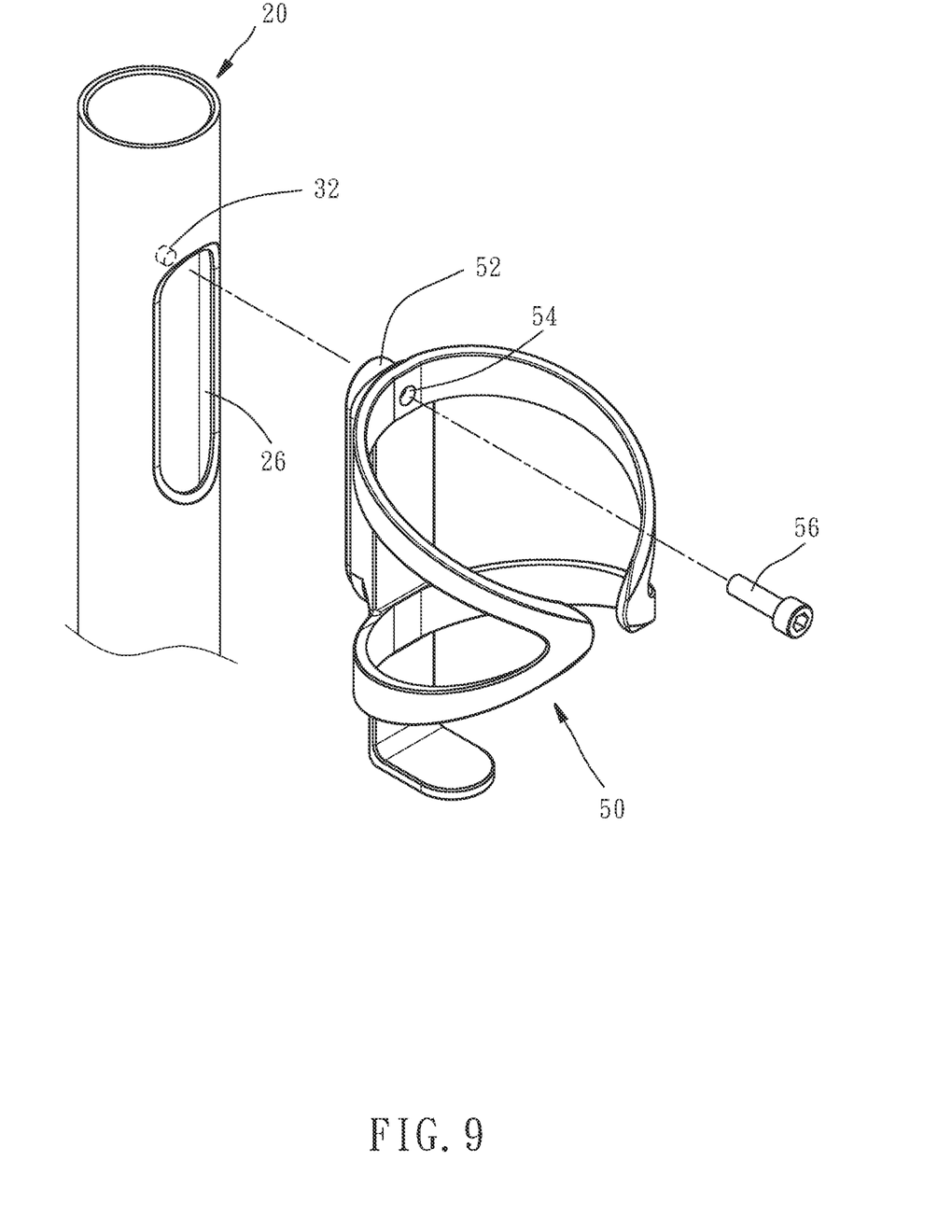
FIG. 9 is an exploded view, showing that the bicycle seatpost is mounted with another kind of the bicycle accessory.

On the other hand, the reinforcing member 30 has a threaded hole 32 communicating with the opening 26 in this embodiment. When the bicycle seatpost 10 is mounted with a bicycle accessory 50 (such as a lamp in FIG. 8 or a bottle cage in FIG. 9), a protrusion 52 of the bicycle accessory 50 is inserted into the opening 26 of the seatpost body 20, and then the bicycle accessory 50 is threaded with the threaded hole 32 of the reinforcing member 30 by using a screw 56 passing through a counterbore 54 of the bicycle accessory 50, thus completing assembly of the bicycle accessory 50. What needs to be added here is that the seatpost body 20 and the bicycle accessory 50 are not limited to be screwed together. They can be combined with each other by an interference fit or snap fit. Further, in addition to the lamp and the bottle cage, the bicycle accessory 50 also can be a rearview lens, rear bag or electrical component. In terms of the electrical component, as shown in FIG. 7, the electrical component is installed in the installation space 34 in a manner that it does not protrude out of the outer surface 24 of the seatpost body 20 and extends along the axial direction of the seatpost body 20, and further, the electrical component is electrically connected to the rechargeable battery 42.

As indicated above, the bicycle seatpost 10 of the present invention uses the opening 26 for installation of the bicycle accessory 50 and uses the reinforcing member 30 to make the seatpost body 20 maintain sufficient structural strength, such that the seatpost body 20 will not weaken its structure because of the opening 26, thereby achieving the purpose of the present invention.

What is claimed is:

1. A bicycle seatpost comprising:
a seatpost body having an inner surface, an outer surface, and an opening through the inner and outer surfaces; and
a reinforcing member disposed to the inner surface of the seatpost body and having a part corresponding to the opening, such that an installation space is formed between the reinforcing member and the opening for installation of a bicycle accessory,
wherein a bottom end of the reinforcing member extends to be flushed with a bottom end of the seatpost body.

2. The bicycle seatpost as claimed in claim 1, wherein two opposite lateral sides of the reinforcing member are fixed to the inner surface of the seatpost body, and the reinforcing member extends straight along a radial direction of the seatpost body.

3. The bicycle seatpost as claimed in claim 1, wherein the reinforcing member has two opposite lateral sides fixed to the inner surface of the seatpost body in a way that parts of the reinforcing member curve outwardly with respect to the opening.

4. The bicycle seatpost as claimed in claim 1, wherein the reinforcing member has two opposite lateral sides fixed to the inner surface of the seatpost body in a way that, parts of the reinforcing member curve inwardly with respect to the opening.

5. The bicycle seatpost as claimed in claim 1, wherein the reinforcing member extends along an axial direction of the seatpost body; a top end of the reinforcing member is higher than a top end of the opening, and the bottom end of the reinforcing member is lower than a bottom end of the opening.

6. The bicycle seatpost as claimed in claim 1, wherein the reinforcing member has a threaded hole communicating with the opening.

7. The bicycle seatpost as claimed in claim 1, wherein the opening is located at a front side of the seatpost body or a rear side of the seatpost body.

8. The bicycle seatpost as claimed in claim 1, wherein the opening extends along an axial direction of the seatpost body.

9. The bicycle seatpost as claimed in claim 1, wherein the bicycle accessory is installed in the installation space in a manner that the bicycle accessory does not protrude out of the outer surface of the seatpost.

10. The bicycle seatpost as claimed in claim 1, wherein the bicycle accessory is installed in the installation space in a manner that the bicycle accessory extends along an axial direction of the seatpost body.

11. The bicycle seatpost as claimed in claim 1, wherein the bicycle accessory is an electrical component for electrically connected to a rechargeable battery disposed at the bottom end of the seatpost body.

12. The bicycle seatpost as claimed in claim 1, wherein the bicycle accessory is a lamp, a rearview lens, a bottle cage, or a rear bag.

\* \* \* \* \*